(12) United States Patent
Bae et al.

(10) Patent No.: US 12,293,549 B2
(45) Date of Patent: May 6, 2025

(54) ELECTRONIC DEVICE PROVIDING AUGMENTED REALITY/VIRTUAL REALITY AND OPERATING METHOD THEREOF

(71) Applicant: Samsung Electronics Co., Ltd., Gyeonggi-do (KR)

(72) Inventors: Hyungjin Bae, Gyeonggi-do (KR); Kwangmin Byeon, Gyeonggi-do (KR); Seungbum Lee, Gyeonggi-do (KR); Seungseok Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 370 days.

(21) Appl. No.: 17/863,522

(22) Filed: Jul. 13, 2022

(65) Prior Publication Data

US 2022/0343542 A1    Oct. 27, 2022

Related U.S. Application Data

(63) Continuation of application No. PCT/KR2022/009715, filed on Apr. 6, 2022.

(51) Int. Cl.
  *G06T 7/90*    (2017.01)
  *G06T 7/55*    (2017.01)
  *G06T 7/70*    (2017.01)

(52) U.S. Cl.
  CPC .................. *G06T 7/90* (2017.01); *G06T 7/55* (2017.01); *G06T 7/70* (2017.01)

(58) Field of Classification Search
  CPC .... G06T 7/90; G06T 7/55; G06T 7/70; H04N 2213/003; H04N 13/194; H04N 13/332;
  (Continued)

(56) References Cited

U.S. PATENT DOCUMENTS 8,040,361 B2   10/2011   Bachelder et al.
8,923,604 B2   12/2014   Kim et al.
(Continued)

FOREIGN PATENT DOCUMENTS

EP   1 081 654 A2   3/2001
EP   3 465 627 B1   4/2020
(Continued)

OTHER PUBLICATIONS

International Search Report dated Oct. 7, 2022.
(Continued)

*Primary Examiner* — Wassim Mahrouka
(74) *Attorney, Agent, or Firm* — Cha & Reiter, LLC

(57) ABSTRACT

According to an embodiment, an electronic device for providing augmented reality and operating method includes: transmitting color information indicating colors of a plurality of pixels forming a first frame and depth information indicating depths of the plurality of pixels to a first external electronic device connected through the communication circuit; obtaining color information and depth information of a second frame following the first frame; calculating an amount of change of depth information of at least one object included in the first frame and the second frame based on the depth information of the first frame and the depth information of the second frame; and transmitting the depth information of the second frame together with the color information of the second frame to the first external electronic device based on that the amount of change of the depth information is greater than or equal to the specified depth threshold.

18 Claims, 8 Drawing Sheets

(58) Field of Classification Search
CPC .... H04N 13/344; H04N 13/128; H04N 13/15; H04N 13/161
See application file for complete search history.

(56) References Cited

U.S. PATENT DOCUMENTS

| | | | |
|---|---|---|---|
| 10,114,454 B2 | 10/2018 | Boulton et al. | |
| 10,217,189 B2 | 2/2019 | Russell | |
| 10,237,531 B2 | 3/2019 | Boulton et al. | |
| 10,453,272 B2 | 10/2019 | Bates | |
| 10,672,197 B2 | 6/2020 | Bates | |
| 11,099,396 B2 | 8/2021 | Peri | |
| 11,417,065 B2 | 8/2022 | Taylor et al. | |
| 2011/0109731 A1* | 5/2011 | Koo | H04N 13/144 348/51 |
| 2016/0065946 A1 | 3/2016 | Cole et al. | |
| 2016/0065947 A1 | 3/2016 | Cole et al. | |
| 2017/0076429 A1* | 3/2017 | Russell | G06T 15/04 |
| 2017/0374341 A1 | 12/2017 | Michail et al. | |
| 2021/0409672 A1 | 12/2021 | Cole et al. | |
| 2023/0051960 A1* | 2/2023 | Sonneveldt | H04N 19/597 |

FOREIGN PATENT DOCUMENTS

| | | |
|---|---|---|
| EP | 3840389 A1 | 6/2021 |
| KR | 10-2011-0050364 A | 5/2011 |
| KR | 10-1699920 B1 | 1/2017 |
| KR | 10-2017-0133444 A | 12/2017 |
| KR | 10-1920035 B1 | 11/2018 |

OTHER PUBLICATIONS

Extended European Search Report dated Aug. 20, 2024.
Stereo Image Sequence Coding Based on Three-dimensional Motion Estimation and Compensation.

* cited by examiner

ELECTRONIC DEVICE PROVIDING AUGMENTED REALITY/VIRTUAL REALITY AND OPERATING METHOD THEREOF

CROSS REFERENCE TO RELATED APPLICATION(S)

This application is a continuation of International Application No. PCT/KR2022/009715 designating the United States, filed on Jul. 6, 2022, in the Korean Intellectual Property Receiving Office. This application is based on and claims priority under 35 U.S.C. 119 to Korean Patent Application No. 10-2021-0096121, filed on Jul. 22, 2021, in the Korean Intellectual Property Office, the disclosure of which is incorporated herein by reference in its entirety.

BACKGROUND

Technical Field

The disclosure relates to an electronic device providing augmented reality/virtual reality and an operating method of the same.

Description of Related Art

Virtual reality (VR) and/or augmented reality (AR) can perform rendering and vision processing either on a head mounted display (HMD) device (e.g., smart glasses), or an electronic device (e.g., a smartphone).

The HMD device may adjust the rendered frame based on the pose of the user or the location of the user's eyes before displaying the rendered frame (or the frame image). The adjustment may be referred to as a "reprojection" or a "time warping."

Since the reprojection may be processed differently depending on the depth information of at least one object in the rendered frame, in a tethered VR/AR system, it is necessary to transmit depth information of at least one object from the electronic device performing rendering to the HMD device performing reprojection.

When the electronic device transmits depth information associated with all frames to the HMD device, the amount of data transmission may be excessive. For example, even when there is no or little change in the depth information, the electronic device may need to transmit the entire depth information to the HMD device.

SUMMARY

According to an embodiment, an electronic device comprises: a communication circuit; a memory; and a processor operatively connected with the communication circuit and the memory, and wherein the memory stores one or more instructions that, when executed, cause the processor to perform a plurality of operations, the plurality of operations comprising: transmitting color information indicating colors of a plurality of pixels forming a first frame and depth information indicating depths of the plurality of pixels to a first external electronic device connected through the communication circuit; obtain color information and depth information of a second frame following the first frame; calculating an amount of change of depth information of at least one object included in the first frame and the second frame based on the depth information of the first frame and the depth information of the second frame; determining whether the amount of change of depth information is greater than or equal to a specified depth threshold; and transmitting the depth information of the second frame together with the color information of the second frame to the first external electronic device based on that being determined that the amount of change of the depth information is greater than or equal to the specified depth threshold.

According to an embodiment, an electronic device comprises: a communication circuit; a sensor; a display; a memory; and a processor operatively connected with the communication circuit, the sensor, the display, and the memory, and wherein the memory stores one or more instructions that, when executed, cause the processor to perform a plurality of operations, the plurality of operations comprising: storing color information and depth information of a first frame received from an external electronic device connected through the communication circuit; displaying the first frame on the display based on the color information and the depth information of the first frame; displaying a second frame on the display based on color information and depth information of the second frame based on the color information and the depth information of the second frame following the first frame being received from the external electronic device through the communication circuit; and displaying the second frame on the display based on the color information of the second frame and the depth information of the first frame based on only the color information of the second frame being received without receiving the depth information of the second frame from the external electronic device through the communication circuit.

According to an embodiments, a method of operating an electronic device, the method comprises: transmitting color information indicating colors of a plurality of pixels forming a first frame and depth information indicating depths of the plurality of pixels to a first external electronic device through a communication circuit of the electronic device; obtaining color information and depth information of a second frame following the first frame; calculating an amount of change of depth information of at least one object included in the first frame and the second frame based on the depth information of the first frame and the depth information of the second frame; determining whether the amount of change of depth information is greater than or equal to a specified depth threshold; and transmitting the depth information of the second frame together with the color information of the second frame to the first external electronic device based on that being determined that the amount of change of the depth information is greater than or equal to the specified depth threshold.

The technical problems to be achieved in the certain embodiments of the disclosure are not limited to the technical problems mentioned above, and another technical problems not mentioned will be clearly understood by those of ordinary skill in the art to which the disclosure belongs from the following description.

With regard to description of drawings, the same or similar components will be marked by the same or similar reference signs.

DETAILED DESCRIPTION

The effects that are achieved through certain embodiments of the disclosure may not be limited to what has been particularly described herein, and other advantages not described herein may be more clearly understood from the following detailed description by persons skilled in the art.

According to certain embodiments, an efficient VR/AR system is provided. In the VR/AR system, there is a first electronic device and a second electronic device. The first electronic device can be a smartphone, while the second electronic device can be a head-mounted display. The first electronic device only (or primarily) transmits depth information of a frame when there is a meaningful change in the reprojection performance. Accordingly, it is possible to preserve bandwidth and reduce battery consumption.

Figure 1:
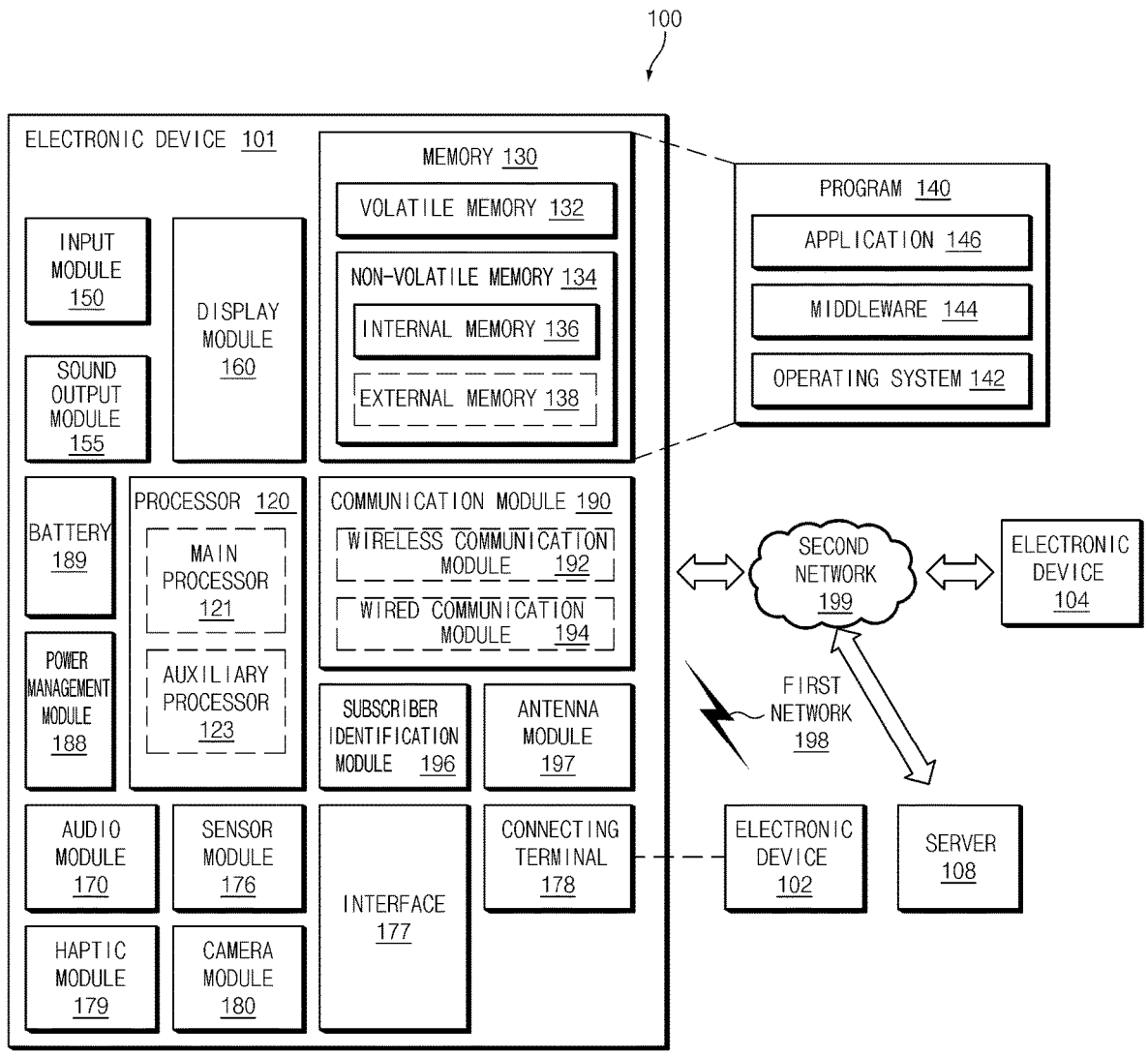
FIG. 1 is a block diagram of an electronic device in a network environment, according to certain embodiments of the disclosure.
Figure 2:
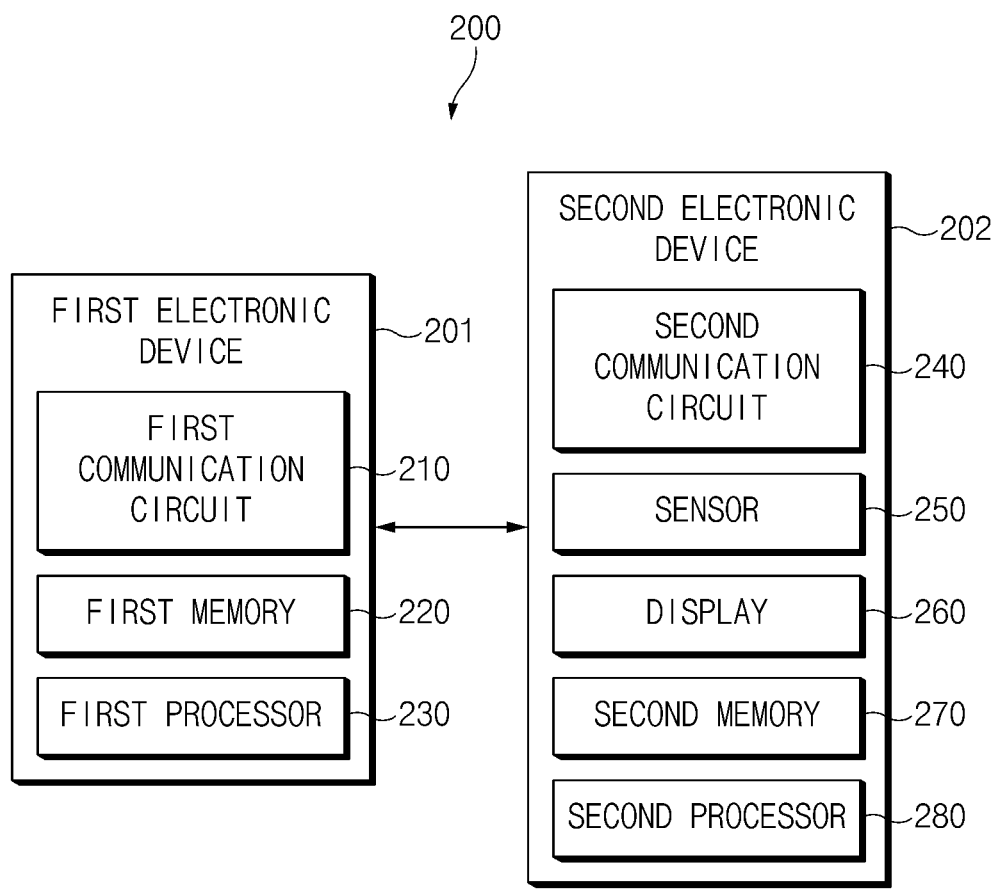
FIG. 2 is a block diagram of an augmented reality (AR)/virtual reality (VR) system, according to an embodiment of the disclosure.

FIG. 1 describes an electronic device. FIG. 2 describes a VR/AR system with a first electronic device and a second electronic device.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device 101 may provide a number of functions including providing augmented reality (AR) or virtual reality (VR). FIG. 2 discloses an augmented reality or virtual reality system.

Hereinafter, a configuration and operation of an augmented or virtual reality system according to an embodiment will be described with reference to FIG. 2.

FIG. 2 is a block diagram 200 of a first electronic device 201 and a second electronic device 202. The first electronic device 201 and the second electronic device 202 can provide an AR and/or VR system. The second electronic device 202 can comprise a head mounted display that the user wears over their eyes. The first electronic device 201 can render and transit images for display on the second electronic device 202.

To conserve energy and bandwidth, the first electronic device either transmits color information and depth information of a frame, or only color information. If the depth information has changed in excess of a depth threshold, the first electronic device 201 transmits the color information and the depth information. If the amount of change in the depth information is less than the depth threshold, the first electronic device 201 only transmits the color information.

In certain embodiments, the depth threshold can depend on the change in the pose information of the user. The second electronic device 202 can measure head movement/eye movement using a sensor. Based on the foregoing, the second electronic device 202 determines a change in pose information. The depth threshold is inversely related to the change in pose information.

Referring to FIG. 2, a first electronic device 201 (e.g., the electronic device 101 of FIG. 1) may include a first communication circuit 210 (e.g., the communication module 190 of FIG. 1), a first memory 220 (e.g., the memory 130 of FIG. 1), and a first processor 230 (e.g., the processor 120 of FIG. 1). Although not illustrated in FIG. 2, the first electronic device 201 may further include at least one of the components of the electronic device 101 illustrated in FIG. 1.

The first communication circuit 210 may establish a direct wired communication channel or a wireless communication channel between the first electronic device 201 and the second electronic device 202. and support communication through the established communication channel. For example, the first communication circuit 210 may transmit at least one of an image or information associated with the image as a virtual reality (VR) content or an augmented reality (AR) content in units of frames to the second electronic device 202.

The image may represent a three-dimensional scene (a three-dimensional image). The image may include color information indicating colors of a plurality of pixels constituting a frame corresponding to the image. The color information may include a red-green-blue (RGB) value.

The information associated with the image may include depth information associated with the image used for reprojecting the received image depending on a user's pose, or the position of the user's eyes, before the second electronic device 202 displays the image received from the first electronic device 201. The depth information may refer to information indicating depths of a plurality of pixels constituting a frame. The depth information may include a gray level. The gray level is a numerical value of the brightness of a pixel, and as the brightness increases, the number of gray levels may increase. As the number of gray levels increases, the depth of the corresponding pixel may be greater. For example, the first communication circuit 210 may receive sensing information obtained by using the sensor (e.g., a sensor 250) of the external electronic device from the external electronic device (e.g., the second electronic device 202). The sensing information may include at least one of position information, direction information, and movement information of the external electronic device (e.g., the second electronic device 202).

The first memory 220 may store one or more instructions executed by the first processor 230. The first memory 220 may at least temporarily store data used for the first electronic device 201 to perform an operation. For example, the first memory 220 may at least temporarily store at least one of an image or information of the image associated with a plurality of frames transmitted to the second electronic device 202. For example, the first memory 220 may store at least one of color information and depth information associated with the plurality of frames transmitted to the second electronic device 202.

The first processor 230 may control an operation of the first electronic device 201 by executing instructions stored in the first memory 220. According to an embodiment, the first processor 230 may render a plurality of images corresponding to the plurality of frames based on depth information on the plurality of frames that are at least temporarily stored in the first memory 220. For example, the depth information may be a gray level image (or a gray scale image). The rendered image may be referred to as color information. For example, the color information may be an RGB image. The first processor 230 may at least temporarily store color information associated with the plurality of frames in the first memory 220.

The first processor 230 may transmit at least one of color information and depth information of a plurality of frames in frame order through the first communication circuit 210 to the second electronic device 202. For example, the first processor 230 may obtain at least one of color information and depth information of each frame from the first memory 220, and may transmit at least one of the obtained color information and depth information in frame order through the first communication circuit 210 to the second electronic device 202.

The first processor 230 may transmit color information of the first frame and depth information of the first frame to the second electronic device 202. The first processor 230 may obtain color information and depth information of the second frame following the first frame. For example, when the first processor 230 obtains color information and depth information of a frame, it may mean that the first processor 230 reads the color information and the depth information of the frame stored in the first memory 220. The first processor 230 may transmit at least one of color information and depth information of the second frame to the external electronic device (e.g., the second electronic device 202).

The first processor 230 may calculate an amount of change of the depth information of at least one object included in the first frame and the second frame. The amount of change of the depth information is based on the depth information of the first frame and the depth information of the second frame. The amount of change of the depth information may mean a amount of change of depth information of at least one object included in the first frame and the second frame, according to a frame change from the first frame to the second frame.

The first processor 230 may calculate the amount of change of the depth information based on at least one of the number of objects included in each of the first frame and the second frame, and depth information of at least one object in each of the first frame and the second frame. The depth information of the at least one object may include depth information of at least one pixel corresponding to the at least one object. For example, the depth information of the at least one object in the first frame may include a gray level corresponding to each of the at least one object in a gray level image of the first frame. The first processor 230 may determine the gray level corresponding to the object based on at least one of the average, total, maximum, and minimum gray levels of at least one pixel corresponding to the object. The above description may be equally applied to depth information of at least one object in the second frame.

According to certain embodiments, the amount of change in the depth information for an object can be the sum of absolute differences in the depth of each of the pixels of the at least one object.

The first processor 230 may calculate the amount of change of the depth information. The amount of change information can be calculated by calculating a difference between the number of objects included in the first frame and the number of objects included in the second frame. The first processor 230 may determine that the amount of change of the depth information is larger as the difference between the number of objects included in the first frame and the number of objects included in the second frame increases.

The first processor 230 may calculate the amount of change of the depth information by calculating that the number of objects of which depth information in the second frame is changed by more than a specified amount of change. The specified amount of change may include a specified value for the difference between a gray level in the first frame and a gray level in the second frame of the object. For example, when the specified amount of change is 10, the first processor 230 may calculate the amount of change of the depth information by calculating the number of objects in which the difference between the gray level in the first frame and the gray level in the second frame is 10 or more with respect to the same object.

The first processor 230 may calculate the amount of change of the depth information by calculating an average value of a amount of change from the depth information in the first frame to the depth information in the second frame with respect to at least one object included in the first frame and the second frame. The amount of change of the depth information may include a difference between a gray level in the first frame and a gray level in the second frame of the object. The first processor 230 may calculate an average value of the amount of change of the depth information by dividing the amount of change of the depth information of all the objects by the number of objects. For example, when a first object, a second object, and a third object exist in the first frame, a first object, a second object, a third object, and a fourth object exist in the second frame, a difference between the gray level in the first frame and the gray level in the second frame of the first object is 3, a difference between the gray level in the first frame and the gray level in the second frame of the second object is 10, a difference between the gray level in the first frame and the gray level in the second frame of the third object is 5, and the gray level in the second frame of the fourth object is 6 (since the gray level in the first frame of the fourth object is 0, the difference between the gray level in the first frame of the fourth object and the gray level in the second frame is 6), the first processor 230 may calculate the amount of change ((3+10+5+6)/4=6) of the depth information by dividing a value obtained by adding a amount of change (3) of depth information of the first object, a amount of change (10) of depth information of the second object, a amount of change (5) of the depth information of the third object, and the amount of change (6) of the depth information of the fourth object by the total number (4) of objects.

The first processor 230 is not limited to the above-described method for calculating the amount of change of the depth information, may calculate the amount of change of the depth information in various other methods, and may calculate a final amount of change of the depth information by synthesizing values calculated by a plurality of methods. For example, the first processor 230 may calculate the amount of change of the depth information based on at least two of a difference between the number of objects included in the first frame and the number of objects included in the second frame, the number of objects of which depth information in the second frame is changed by more than a specified amount of change based on the depth information in the first frame, and the average value of the amount of change from the depth information in the first frame to the depth information in the second frame with respect to at least one object included in the first frame and the second frame.

The first processor 230 may determine whether the amount of change of the depth information is equal to or greater than a specified depth threshold. The specified depth threshold may include a specified depth threshold according to a method of calculating the amount of change of the depth information. The specified depth threshold may include at least one of a first specified depth threshold for a difference between the number of objects included in the first frame and the number of objects included in the second frame, a second specified depth threshold for the number of objects of which depth information in the second frame is changed by more than a specified amount of change based on the depth information in the first frame, and a third specified depth threshold for the average value of the amount of change from the depth information in the first frame to the depth information in the second frame with respect to at least one object included in the first frame and the second frame.

The first processor 230 may determine whether a difference (hereinafter, a amount of change of first depth information) between the number of objects included in the first frame and the number of objects included in the second frame is greater than or equal to the first specified depth threshold. The first processor 230 may determine whether the number of objects (hereinafter, a amount of change of second depth information) of which depth information in the second frame is changed by more than a specified amount of change based on the depth information in the first frame is greater than or equal to the second specified depth threshold.

The first processor 230 may determine whether the average value (hereinafter, a amount of change of third depth information) of the amount of change from the depth information in the first frame to the depth information in the second frame with respect to at least one object included in the first frame and the second frame is greater than or equal to the third specified depth threshold. According to an embodiment, when the first processor 230 calculates the amount of change of the depth information based on at least two values of the amount of change of the first depth information, the amount of change of the second depth information, and the amount of change of the third depth information, the first processor 230 may compare the amount of change of the first depth information, the amount of change of the second depth information, and the amount of change of the third depth information with the first specified depth threshold, the second specified depth threshold, and the third specified depth threshold, respectively, and then may determine whether the amount of change of the depth information is greater than or equal to a specified depth threshold.

The first processor 230 may determine whether to transmit the depth information of the second frame based on the amount of change of the depth information. The first processor 230 may determine whether to transmit the depth information of the second frame depending on whether the amount of change of the depth information is equal to or greater than a specified depth threshold. When the first processor 230 determines that the amount of change of the depth information is equal to or greater than the specified depth threshold, the first processor 230 may transmit the depth information of the second frame together with the color information of the second frame through the first communication circuit 210 to the external electronic device (e.g., the second electronic device 202). When the first processor 230 determines that the amount of change of the depth information is less than the specified depth threshold, the first processor 230 may transmit only the color information of the second frame except for the depth information of the second frame to the external electronic device (e.g., the second electronic device 202). For example, when the first processor 230 determines that the amount of change of the depth information is less than the specified depth threshold, the first processor 230 may transmit only the color information of the second frame among the color information of the second frame and the depth information of the second frame to the external electronic device (e.g., the second electronic device 202). When the first processor 230 determines that the amount of change of the depth information is less than the specified depth threshold, the first processor 230 may transmit notification information indicating that there is no depth information to be transmitted to the external electronic device (e.g., the second electronic device 202). When the external electronic device (e.g., the second electronic device 202) receives the notification information indicating that there is no depth information to be transmitted from the first electronic device 201, the external electronic device may reuse the previously stored depth information of the previous frame.

The first processor 230 may receive the sensing information obtained by using the sensor (e.g., the sensor 250) of the external electronic device through the first communication circuit 210 from the external electronic device (e.g., the second electronic device 202). According to an embodiment, the first processor 230 may receive the sensing information from the external electronic device (e.g., the second electronic device 202) according to a specified period. For example, the specified period may be the same as a period in which the first processor 230 transmits at least one of color information and depth information to the external electronic device (e.g., the second electronic device 202). As another example, the specified period may be the same as a period in which the external electronic device (e.g., the second electronic device 202) displays the rendered image received from the first electronic device 201 on the display (e.g., a display 260), or performs the reprojection before display. According to an embodiment, the sensing information may include at least one of position information, direction information, and movement information of the external electronic device (e.g., the second electronic device 202).

According to an embodiment, the first processor 230 may calculate a amount of change of pose information indicating a change in a pose of the user of the external electronic device (e.g., the second electronic device 202) based on the obtained sensing information. According to an embodiment, the external electronic device (e.g., the second electronic device 202) may be a wearable electronic device worn on at least a part of the user's body. For example, position information, direction information, or movement information of the external electronic device (e.g., the second electronic device 202) obtained using the sensor (e.g., the sensor 250) of the external electronic device (e.g., the second electronic device 202) may correspond to a change in the pose of the user of the external electronic device (e.g., the second electronic device 202). For example, the first processor 230 may calculate a amount of change of the pose information by calculating a difference (or a change) of the measured value of the sensor (e.g., the sensor 250) of the external electronic device (e.g., the second electronic device 202) before and after the pose change of the user of the external electronic device (e.g., the second electronic device 202). For example, the sensor (e.g., the sensor 250) of the external electronic device (e.g., the second electronic device 202) may include at least one of an acceleration sensor and a gyro sensor. For example, the first processor 230 may calculate the amount of change of the pose information based on the amount of change of the x-axis, y-axis, and z-axis of the acceleration sensor of the external electronic device (e.g., the second electronic device 202), but is not limited thereto.

According to an embodiment, the first processor 230 may determine a specified depth threshold associated with the amount of change of the depth information based on the amount of change of the pose information. According to an embodiment, the first processor 230 may determine the specified depth threshold associated with the amount of change of the depth information according to whether the amount of change of the pose information is equal to or greater than the specified pose threshold. According to an embodiment, the specified pose threshold may include a specified value associated with the amount of change of the pose information. For example, the specified pose threshold may include at least one of a first specified pose threshold for the x-axis amount of change of the acceleration sensor of the external electronic device (e.g., the second electronic device 202), a second specified pose threshold for the y-axis amount of change of the acceleration sensor of the external electronic device (e.g., the second electronic device 202), and the third specified pose threshold for the z-axis amount of change of the acceleration sensor of the external electronic device (e.g., the second electronic device 202). The first processor 230 may determine whether the x-axis amount of change is greater than or equal to the first specified pose threshold, whether the y-axis amount of change is greater than or equal to the second specified pose threshold, or whether the z-axis amount of change is greater than or equal to the third specified pose threshold. For example, the first processor 230 may determine whether the amount of change of the pose information is equal to or greater than a specified pose threshold based on at least one of whether the x-axis amount of change is greater than or equal to the first specified pose threshold, whether the y-axis amount of change is greater than or equal to the second specified pose threshold, and whether the z-axis amount of change is greater than or equal to the third specified pose threshold.

According to an embodiment, when the amount of change of the pose information is less than the specified amount of change of the pose information, the first processor 230 may determine the specified depth threshold for the amount of change of the depth information as a first value. According to an embodiment, when the amount of change of the pose information is greater than or equal to the specified amount of change of the pose information, the first processor 230 may determine the specified depth threshold for the amount of change of the depth information as a second value lower (or smaller) than the first value.

According to an embodiment, since the first electronic device 201 transmits depth information of subsequent frames only when the amount of change of the depth information between frames is equal to or greater than the specified depth threshold, without transmitting the depth information every frame to the external electronic device (e.g., the second electronic device 202), it is possible to reduce the data transmission amount, to reduce current consumption, and additionally to transmit other data by the reduced data transmission amount.

According to an embodiment, when the amount of change of the pose information of the user of the external electronic device (e.g., the second electronic device 202) is greater than or equal to the specified pose threshold, the amount of change of the depth information perceived by the user of the external electronic device may be greater than the actual amount of change of the depth information. According to an embodiment, when the amount of change of the pose information is greater than or equal to the specified pose threshold, the first electronic device 201 may determine whether to transmit data according to the actual situation or state of the user of the external electronic device by determining whether to transmit the depth information of subsequent frames based on a lower threshold than when the amount of change of the pose information is not considered with respect to the amount of change of the depth information.

Referring to FIG. 2, the second electronic device 202 may include a second communication circuit 240, the sensor 250 (e.g., the sensor module 176 of FIG. 1), the display 260 (e.g., the display module 160 of FIG. 1), a second memory 270 (e.g., the memory 130 of FIG. 1), and a second processor 280 (e.g., the processor 120 of FIG. 1). Although not illustrated in FIG. 2, the second electronic device 202 may further include at least one of the components of the electronic device 101 illustrated in FIG. 1.

The second communication circuit 240 may establish a direct (e.g., wired) communication channel or a wireless communication channel between the second electronic device 202 and the external electronic device (e.g., the first electronic device 201) (e.g., the electronic device 102, the electronic device 104, or the server 108 of FIG. 1)), and may support performing communication through the established communication channel. For example, the second communication circuit 240 may receive at least one of color information and depth information associated with a plurality of frames from an external electronic device (e.g., the first electronic device 201) in a frame order. For example, the second communication circuit 240 may transmit sensing information obtained by using the sensor 250 to the external electronic device (e.g., the first electronic device 201).

The sensor 250 may detect at least one of a position, a direction, and a movement of the second electronic device 202. The second electronic device 202 may be a wearable electronic device worn on at least a part of the user's body. The sensor 250 may sense a state of the user of the second electronic device 202 and may generate an electrical signal or data value corresponding to the sensed state. For example, the state of the user may include a pose or a pose change of the user. The sensor 250 may include at least one of a gesture sensor, a gyro sensor, an acceleration sensor, and a biometric sensor.

The display 260 may display an image received from the external electronic device (e.g., the first electronic device 201). For example, the second electronic device 202 may be a head mounted display (HMD) device. The display 260 may be disposed in front of the user's eyes while the second electronic device 202 is worn on at least a part of the user's body. the second electronic device 202 may provide a virtual reality content or an augmented reality content to a user's viewing area, thereby improving the sense of reality and immersion in the virtual content.

the second memory 270 may store one or more instructions executed by the second processor 280. The second memory 270 may at least temporarily store data used for the second electronic device 202 to perform an operation. For example, the second memory 270 may at least temporarily store at least one of color information and depth information of a plurality of frames received from the external electronic device (e.g., the first electronic device 201). The second memory 270 may include a first memory area for storing color information and a second memory area for storing depth information. In this case, the first memory area and the second memory area may be physically separated or only conceptually separated. For example, the first memory area and the second memory area may mean different areas (e.g., a memory address area) on one hardware structure.

The second processor 280 may control an operation of the second electronic device 202 by executing instructions stored in the second memory 270. The second processor 280 may store color information of the first frame and depth information of the first frame received from the external electronic device (e.g., the first electronic device 201) through the second communication circuit 240. The second processor 280 may store the color information of the first frame in the first memory area and the depth information of the first frame in the second memory area.

The second processor 280 may display the first frame on the display 260 based on the color information of the first frame and the depth information of the first frame. Displaying the first frame by the second processor 280 may mean displaying an image corresponding to the first frame. The second processor 280 may perform reprojection with respect to the rendered image received from the external electronic device (e.g., the first electronic device 201) based on the depth information of the first frame, and may display the image on which the reprojection is performed on the display 260. In this case, the rendered image received from the external electronic device (e.g., the first electronic device 201) may be referred to as color information of the first frame. The above description may be equally applied to a second frame to be described later.

The second processor 280 may receive at least one of color information of the second frame or depth information of the second frame after the first frame from the external electronic device (e.g., the first electronic device 201) through the second communication circuit 240. As described above, when the amount of change of the depth information of at least one object included in the first frame and the second frame is greater than or equal to a specified threshold, the first electronic device 201 may transmit the depth information of the second frame after the first frame to the second electronic device 202 together with color information of the second frame, and when the amount of change of the depth information is less than the specified threshold, the first electronic device 201 may transmit only the color information of the second frame to the second electronic device 202 without transmitting the depth information of the second frame.

As color information of the second frame and depth information of the second frame are received from the external electronic device (e.g., the first electronic device 201), the second processor 280 may store the color information of the second frame and the depth information of the second frame. The second processor 280 may store the color information of the second frame in the first memory area and the depth information of the second frame in the second memory area. The second processor 280 may update the information stored in the first memory area from the color information of the first frame to the color information of the second frame, and may update the information stored in the second memory area from the depth information of the first frame to the depth information of the second frame. As only color information of the second frame is received without receiving depth information of the second frame from the external electronic device (e.g., the first electronic device 201), the second processor 280 may store the color information of the second frame and the depth information of the first frame. The second processor 280 may store the color information of the second frame in the first memory area. Depth information of the first frame may be stored in the second memory area.

The second processor 280 may display the second frame after the first frame on the display 260 based on the color information stored in the first memory area and the depth information stored in the second memory area. When both color information of the second frame and depth information of the second frame are received from the external electronic device (e.g., the first electronic device 201), the second processor 280 may display the second frame based on color information of the second frame stored in the first memory area and depth information of the second frame stored in the second memory area. When only color information of the second frame among color information of the second frame and depth information of the second frame is received from the external electronic device (e.g., the first electronic device 201), the second processor 280 may display the second frame based on color information of the second frame stored in the first memory area and depth information of the first frame stored in the second memory area.

The second electronic device 202 may reduce current consumption while performing accurate reprojection by updating the depth information only when it is determined that the updated depth information is necessary in the stage of performing the reprojection before displaying the plurality of images received from the external electronic device (e.g., the first electronic device 201) on the display.

Hereinafter, an operation in which the electronic device according to an embodiment determines whether to transmit depth information of a frame based on a amount of change of depth information will be described with reference to FIG. 3.

Figure 3:
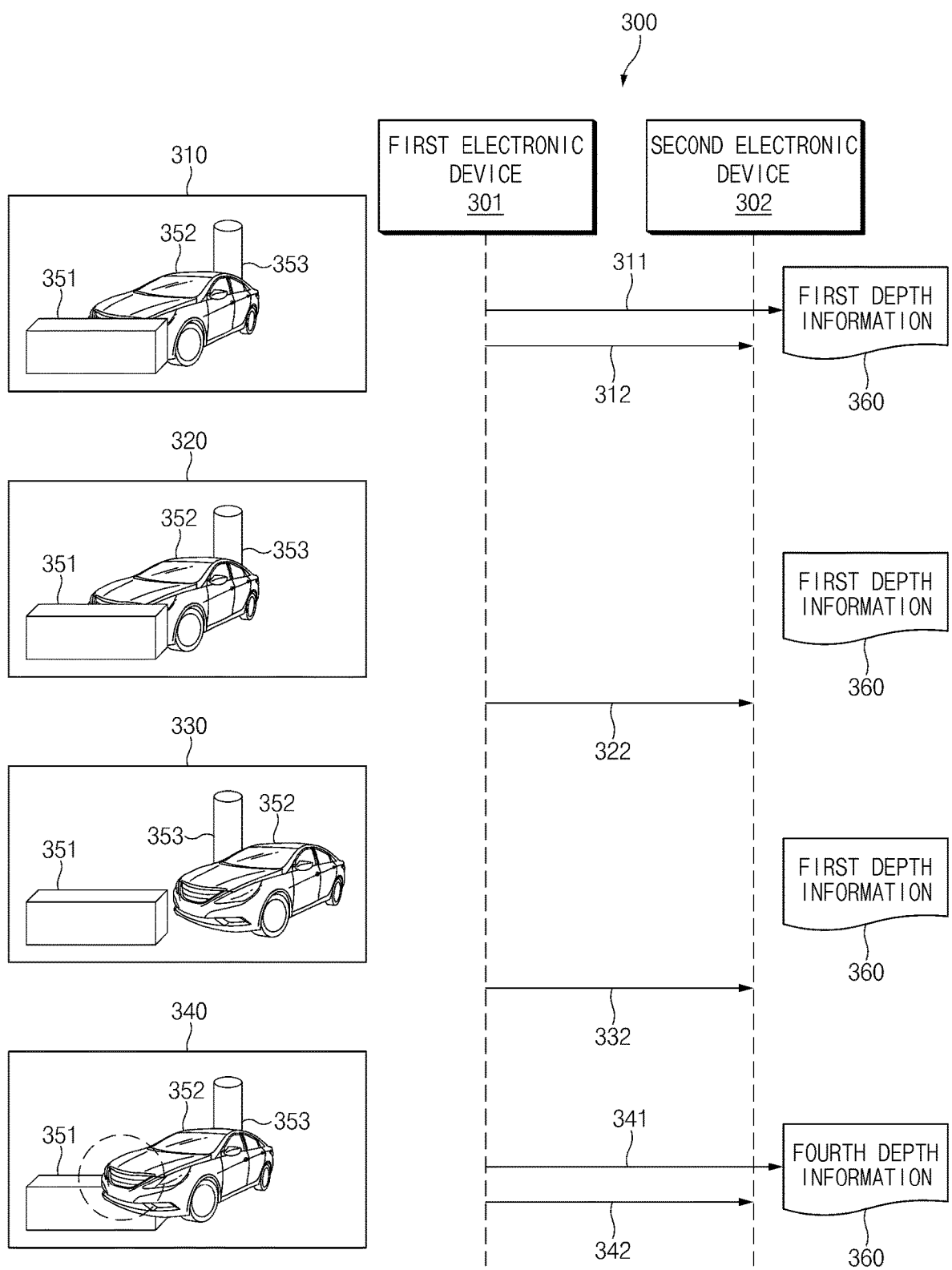
FIG. 3 is a diagram for describing an operation of an electronic device, according to an embodiment of the disclosure.

In FIG. 3, the second electronic device 302 may operate as a head mounted display while the first electronic device 301 renders frames 310 . . . 340. The frames 310 . . . 340 includes objects 351, 352, and 353. Each of the objects are associated with depth information. When the amount of change in the depth information is greater than or equal to a specified depth threshold, the first electronic device 301 provides color information and depth information to the second electronic device 302. Otherwise, the first electronic device 301 only provides the color information.

FIG. 3 is a diagram 300 for describing an operation of an electronic device according to an embodiment of the disclosure. Operations of a first electronic device 301 described below may be performed by the first electronic device 201 of FIG. 2 or the first processor 230 of the first electronic device 201. Operations of a second electronic device 302 described below may be performed by the second electronic device 202 of FIG. 2 or the second processor 280 of the second electronic device 202.

Referring to FIG. 3, a first frame 310, a second frame 320, a third frame 330, and a fourth frame 340 may include a first object 351, a second object 352, and a third object 353. The first electronic device 301 may obtain first color information that is color information of the first frame 310 and first depth information that is depth information of the first frame 310. The first electronic device 301 may transmit the first color information to the second electronic device 302 (operation 312). The first electronic device 301 may transmit the first depth information to the second electronic device 302 (operation 311). The second electronic device 302 may store the color information received from the first electronic device 301 in a first memory area (not illustrated), and may store the depth information received from the first electronic device 301 in a second memory area 360. The contents described above with reference to FIG. 2 may be applied to the first memory area (not illustrated) and the second memory area 360. The second electronic device 302 may store the first color information in the first memory area (not illustrated) and may store the first depth information in the second memory area 360. The second electronic device 302 may display the first frame on the display (e.g., the display 260 of FIG. 2) based on the first color information stored in the first memory area (not illustrated) and the first depth information stored in the second memory 360.

The first electronic device 301 may obtain second color information that is color information of the second frame 320 and second depth information that is depth information of the second frame 320. There may be no change in the first object 351, the second object 352, and the third object 353 in the first frame 310 and the second frame 320. In this case, the change of the objects may include a change of at least one of a position, a direction, and a distance of the objects. According to an embodiment, when all objects included in the frame do not change, the first electronic device 301 may transmit only color information among color information and depth information of the corresponding frame to the second electronic device 302. The first electronic device 301 may transmit the second color information to the second electronic device 302 (operation 322). The second electronic device 302 may store the second color information in the first memory area (not illustrated). The second memory area 360 may maintain a state in which the first color information is stored. The second electronic device 302 may display the second frame on the display (e.g., the display 260 of FIG. 2) based on the second color information stored in the first memory area (not illustrated) and the first depth information stored in the second memory 360.

The first electronic device 301 may obtain third color information that is color information of the third frame 330 and third depth information that is depth information of the third frame 330. According to an embodiment, at least one of a position, a direction, and a distance of at least one of the first object 351, the second object 352, and the third object 353 may be changed in the third frame 330, compared to the second frame 320. According to an embodiment, when there is a change in at least one object (e.g., the second object 352) included in a frame (e.g., the third frame 330) and a previous frame (e.g., the second frame 320) of the corresponding frame, the first electronic device 301 may calculate a amount of change of the depth information of at least one object (e.g., the first object 351, the second object 352, and the third object 353) included in the corresponding frame (e.g., the third frame 330) and the previous frame (e.g., the second frame 320) of the corresponding frame. For a method of calculating the amount of change of the depth information, the same contents described above with reference to FIG. 2 may be applied. The first electronic device 301 may calculate the amount of change of the depth information of at least one object (the first object 351, the second object 352, or the third object 353) included in the second frame 320 and the third frame 330.

The first electronic device 301 may determine whether to transmit depth information (third depth information) of the third frame 330 to the second electronic device 302 according to whether the calculated amount of change of the depth information is equal to or greater than a specified depth threshold. The amount of change of the depth information in the second frame 320 and the third frame 330 may be less than the specified depth threshold. According to an embodiment, as it is determined that the amount of change of the depth information in the second frame 320 and the third frame 330 is less than the specified depth threshold, the first electronic device 301 may determine not to transmit the third depth information to the second electronic device 302. The first electronic device 301 may transmit only the third color information to the second electronic device 302 (operation 332), and does not transmit the third depth information to the second electronic device 302. The second electronic device 302 may store the third color information in the first memory area (not illustrated). The second memory area 360 may maintain a state in which the first depth information is stored. The second electronic device 302 may display the third frame on the display (e.g., the display 260 of FIG. 2) based on the third color information stored in the first memory area (not illustrated) and the first depth information stored in the second memory 360.

The first electronic device 301 may obtain fourth color information that is color information of the fourth frame 340 and fourth depth information that is depth information of the fourth frame 340. According to an embodiment, since there is a change in at least one object included in the third frame 330 and the fourth frame 340, the first electronic device 301 may calculate the amount of change of the depth information of at least one object (the first object 351, the second object 352, or the third object 353) included the third frame 330 and the fourth frame 340. The amount of change of the depth information in the third frame 330 and the fourth frame 340 may be greater than or equal to the specified depth threshold. According to an embodiment, as it is determined that the amount of change of the depth information in the third frame 330 and the fourth frame 340 is greater than or equal to the specified depth threshold, the first electronic device 301 may determine to transmit the fourth depth information to the second electronic device 302. The first electronic device 301 may transmit fourth color information to the second electronic device 302 (operation 342), and may transmit fourth depth information to the second electronic device 302 (operation 341). The second electronic device 302 may store the fourth color information in the first memory area (not illustrated) and may store the fourth depth information in the second memory area 360. The second electronic device 302 may display the fourth frame on the display (e.g., the display 260 of FIG. 2) based on the fourth color information stored in the first memory area (not illustrated) and the fourth depth information stored in the second memory 360.

Hereinafter, an operation of an electronic device according to an embodiment will be described with reference to FIG. 4.

Figure 4:
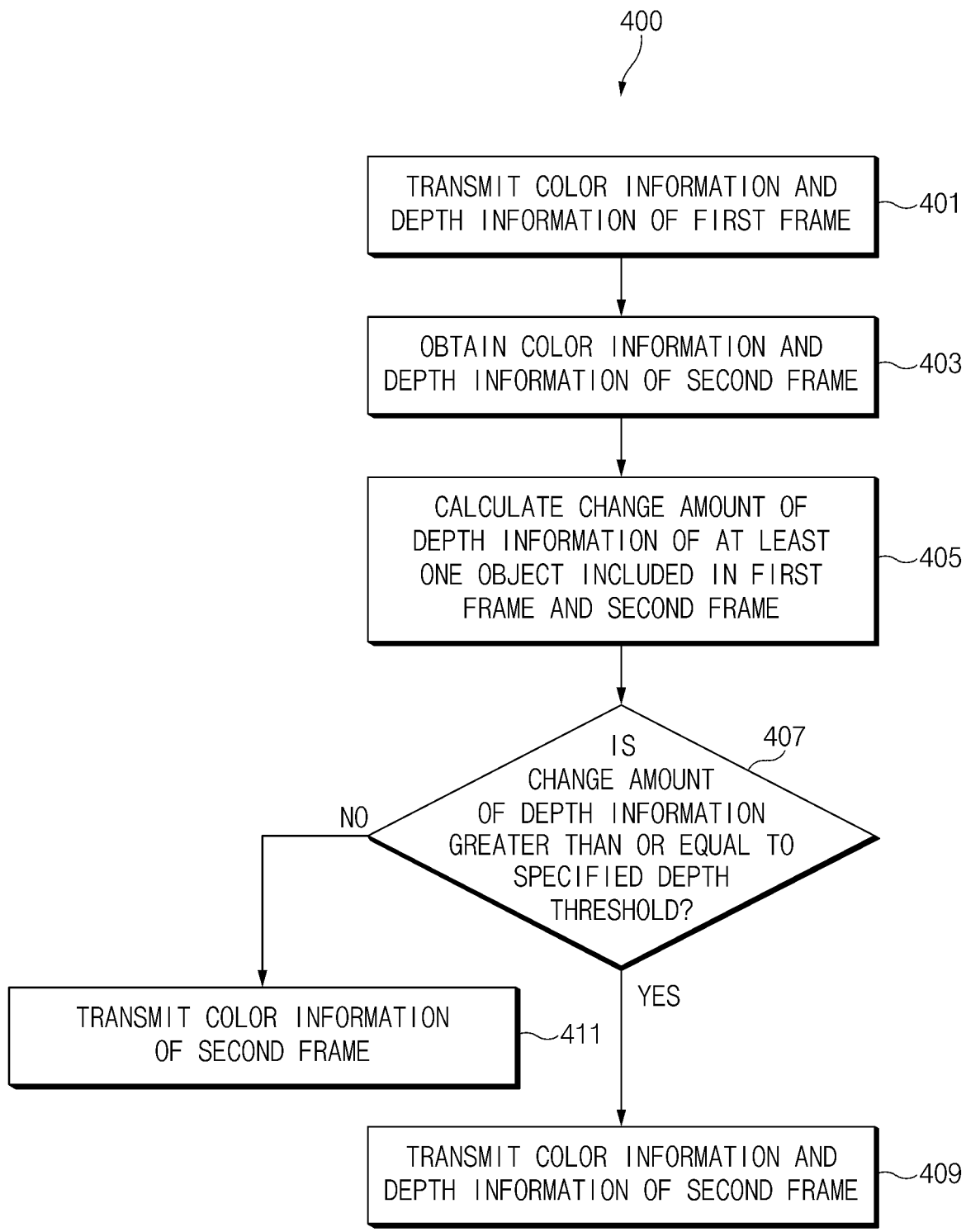
FIG. 4 is a flowchart illustrating an operation of an electronic device, according to an embodiment of the disclosure.

FIG. 4 is a flowchart 400 illustrating an operation of an electronic device according to an embodiment of the disclosure. Operations of an electronic device described below may be performed by the first electronic device 201 of FIG. 2 or the first processor 230 of the first electronic device 201.

In operation 401, the electronic device may transmit color information and depth information of a first frame. The electronic device may render a plurality of images corresponding to a plurality of frames. The color information of the first frame may be an image rendered by the electronic device with respect to the first frame. For example, the color information of the first frame may be an RGB image. The electronic device may render an image corresponding to the first frame based on depth information of the first frame. For example, the depth information of the first frame may be a gray level image (or a gray scale image). The electronic device may transmit color information of the first frame and depth information of the first frame through a communication circuit (e.g., the communication circuit 210 of FIG. 2) to an external electronic device (e.g., the second electronic device 202 of FIG. 2).

In operation 403, the electronic device may obtain color information and depth information of a second frame. The second frame may be a frame following the first frame. The color information of the second frame may be an image rendered by the electronic device with respect to the second frame. For example, the depth information of the second frame may be a gray level image used when the electronic device renders an image corresponding to the second frame. For example, the electronic device may obtain color information and depth information of the second frame by reading color information and depth information of the second frame from a memory (e.g., the first memory 220 of FIG. 2).

In operation 405, the electronic device may calculate a amount of change of depth information of at least one object included in the first frame and the second frame. The electronic device may calculate a amount of change of the depth information of at least one object included in the first frame and the second frame based on the depth information of the first frame and the depth information of the second frame. The electronic device may calculate the amount of change of the depth information based on at least one of the number of objects included in each of the first frame and the second frame, and depth information of at least one object in each of the first frame and the second frame. The depth information of the at least one object may include depth information of at least one pixel corresponding to the at least one object. For example, the depth information of the at least one object may include a gray level corresponding to each of the at least one object in the gray level image. For example, the electronic device may determine the gray level corresponding to the object based on at least one of the average, total, maximum, and minimum values of gray levels of at least one pixel corresponding to the object.

The electronic device may calculate the amount of change of the depth information by calculating a difference between the number of objects included in the first frame and the number of objects included in the second frame. The electronic device may calculate the amount of change of the depth information by calculating the number of objects of which depth information in the second frame is changed by more than a specified amount of change based on the depth information in the first frame among at least one object included in the first frame and the second frame. For example, the specified amount of change may include a specified value for the difference between a gray level in the first frame and a gray level in the second frame of the object. The electronic device may calculate the amount of change of the depth information by calculating an average value of a amount of change from the depth information in the first frame to the depth information in the second frame with respect to at least one object included in the first frame and the second frame. For example, the amount of change of the depth information may include a difference between a gray level in the first frame and a gray level in the second frame of the object. The electronic device may calculate an average value of the amount of change of the depth information by dividing the amount of change of the depth information of all objects included in the first frame and the second frame by the number of all objects included in the first frame and the second frame.

In operation 407, the electronic device may determine whether the amount of change of the depth information is greater than or equal to a specified depth threshold. The specified depth threshold may include a depth threshold specified according to a method of calculating the amount of change of the depth information. The specified depth threshold may include at least one of the first specified depth threshold associated with a difference (hereinafter, a amount of change of first depth information) between the number of objects included in the first frame and the number of objects included in the second frame, the second specified depth threshold associated with the number of objects (hereinafter, a amount of change of second depth information) of which depth information in the second frame is changed by more than a specified amount of change based on the depth information in the first frame, and a third specified depth threshold associated with an average value (hereinafter, a amount of change of third depth information) of the amount of change from the depth information in the first frame to the depth information in the second frame with respect to at least one object included in the first frame and the second frame. The electronic device may determine whether the amount of change of the first depth information is equal to or greater than the first specified depth threshold, may determine whether the amount of change of the second depth information is equal to or greater than the second specified depth threshold, and may determine whether the amount of change of the third depth information is equal to or greater than the third specified depth threshold. The electronic device may perform a comparison operation between the amount of change of the depth information and a specified depth threshold corresponding to the amount of change of the depth information. For example, when the electronic device uses all of the amount of change of the first depth information, the amount of change of the second depth information, and the amount of change of the third depth information, the electronic device may determine that the amount of change of the depth information is equal to or greater than the specified depth threshold, when the amount of change of the first depth information is equal to or greater than the first specified depth threshold, the amount of change of the second depth information is equal to or greater than the second specified depth threshold, and the amount of change of the third depth information is equal to or greater than the third specified depth threshold. In this case, when the amount of change of the first depth information is less than the first specified depth threshold, the amount of change of the second depth information is less than the second specified depth threshold, or the amount of change of the third depth information is less than the third specified depth threshold, the electronic device may determine that the amount of change of the depth information is less than the specified depth threshold. The electronic device may perform operation 409 when it is determined that the amount of change of the depth information is equal to or greater than the specified depth threshold (operation 407—YES), and may perform operation 411 when it is determined that the amount of change of the depth information is less than the specified depth threshold (operation 407—NO).

In operation 409, the electronic device may transmit color information and depth information of the second frame. According to an embodiment, when it is determined that the amount of change of the depth information is equal to or greater than the specified depth threshold, the electronic device may transmit the depth information of the second frame together with the color information of the second frame to the external electronic device.

In operation 411, the electronic device may transmit color information of the second frame. The electronic device may transmit only the color information of the second frame among the color information of the second frame and the depth information of the second frame to the external electronic device when it is determined that the amount of change of the depth information is less than the specified depth threshold. The electronic device may not transmit the depth information of the second frame to the external electronic device when it is determined that the amount of change of the depth information is less than the specified depth threshold.

Hereinafter, an operation of determining, by the electronic device, a specified depth threshold with respect to a amount of change of depth information depending on a amount of change of pose information, according to an embodiment will be described with reference to FIG. 5.

Figure 5:
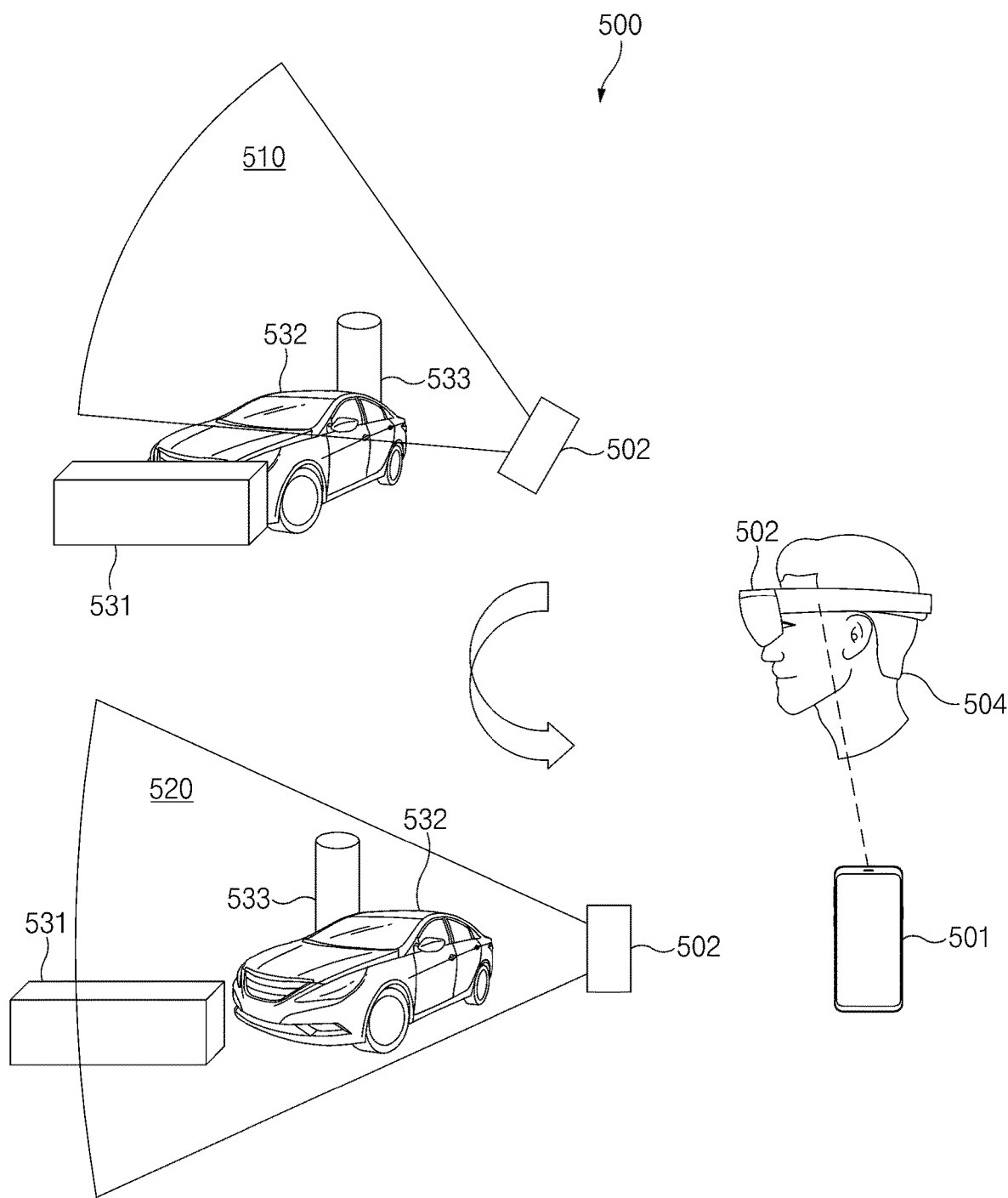
FIG. 5 is a diagram for describing an operation of an electronic device, according to an embodiment of the disclosure.

FIG. 5 is a diagram 500 for describing an operation of an electronic device according to an embodiment of the disclosure. Operations of a first electronic device 501 described below may be performed by the first electronic device 201 of FIG. 2 or the first processor 230 of the first electronic device 201. Operations of a second electronic device 502 described below may be performed by the second electronic device 202 of FIG. 2 or the second processor 280 of the second electronic device 202.

The first electronic device 501 can comprise, for example, a smartphone, while the second electronic device 502 can be head mounted display. The first electronic device 501 renders and provides the images to the second electronic device 502 for display. The second electronic device 502 can include a sensor that determines the information about the change in the user's pose. Based thereon, the specified depth threshold can be changed.

Referring to FIG. 5, the first electronic device 501 may receive sensing information obtained by using a sensor (e.g., the sensor 250 of FIG. 2) of the second electronic device 502. The second electronic device 502 may be worn on at least a part (e.g., the head) of the body of a user 504. The sensing information may include information on the position, direction, or movement of the second electronic device 502. The sensing information can also include information about the position of the pupils of the user's eye. The sensing information may include information associated with a state (e.g., a pose) of the user 504. A pose can include, for example, a direction of the user's line of sight.

When the user 504 changes a pose while wearing the second electronic device 502, a field of view of the user 504 may be changed from a first field of view 510 to a second field of view 520.

As the field of view of the user 504 is changed, even if the amount of change of the depth information is small, a big difference perceived by the user. In this case, the second electronic device 502 needs to update depth information on the changed frame and reproject the image using the updated depth information. For example, the first electronic device 501 needs to apply a different threshold for the amount of change of the depth information for determining whether to transmit the depth information.

The first electronic device 501 may calculate the amount of change of the pose of the user 504 using a sensor from the second electronic device 502. As the amount of change of the pose increases, the variability of the field of view of the user 504 and the degree to which the user 504 perceives the amount of change of the depth information may increase. The first electronic device 501 may determine whether the amount of change of the pose is equal to or greater than a specified pose threshold. The first electronic device 501 may determine a specified depth threshold associated with the amount of change of the depth information based on the amount of change of the pose. For example, the first electronic device 501 may determine the specified depth threshold as a first value when the amount of change of the pose is less than the specified pose threshold, and may determine the specified depth threshold as a second value lower than the first value when the amount of change of the pose is greater than or equal to the specified pose threshold.

Even if the amount of change of the depth information is the same, when the amount of change of the pose is greater than or equal to the specified pose threshold, the first electronic device 501 may determine whether to transmit the depth information according to a state of the user 504 by applying a lower threshold for the amount of change of depth information.

Hereinafter, an operation of an electronic device according to an embodiment will be described with reference to FIG. 6.

Figure 6:
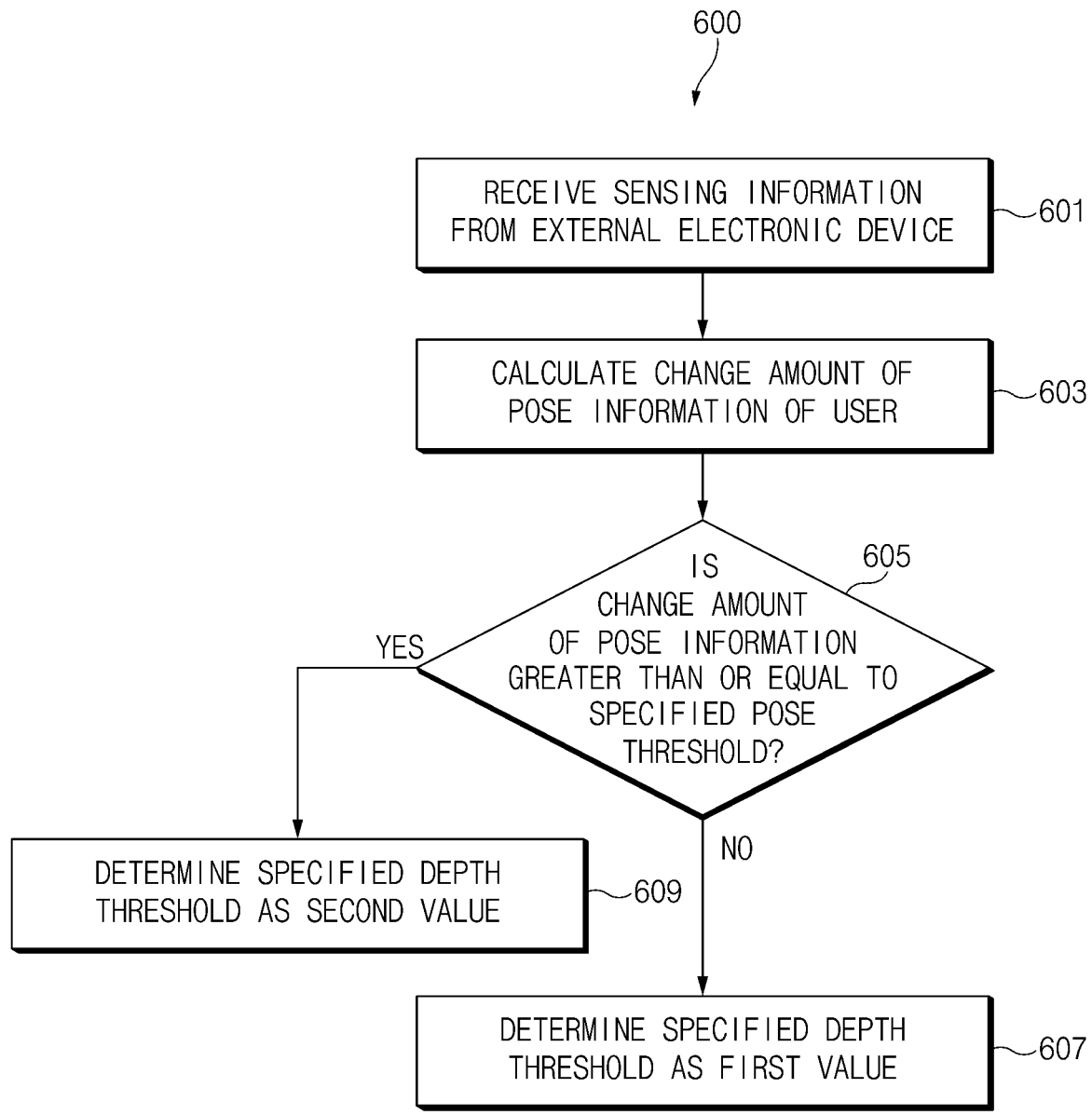
FIG. 6 is a flowchart illustrating an operation of an electronic device, according to an embodiment of the disclosure.

FIG. 6 is a flowchart 600 illustrating an operation of an electronic device according to an embodiment of the disclosure. Operations of an electronic device described below may be performed by the first electronic device 201 of FIG. 2 or the first processor 230 of the first electronic device 201.

In operation 601, the electronic device may receive sensing information from an external electronic device. The external electronic device (e.g., the second electronic device 202 of FIG. 2) is connected to and communicates with the electronic device in a wired or wireless manner, and may be a wearable device that may be worn on at least a part of a user's body. The sensing information may be obtained using a sensor (e.g., the sensor 250 of FIG. 2) of an external electronic device. The sensing information may include information on the position, direction, or movement of the external electronic device. The sensing information may include information about a state (e.g., a pose) of the user. The electronic device may receive sensing information from the external electronic device at a specified period. For example, the specified period may be the same as a period in which the electronic device transmits at least one of color information and depth information to an external electronic device. As another example, the specified period may be the same as a period in which external electronic device displays the rendered image received from the electronic device on the display (e.g., the display 260 of FIG. 2) of the external electronic device or performs reprojection before displaying the rendered image.

In operation 603, the electronic device may calculate a amount of change of the pose information of the user. The electronic device may calculate the amount of change of the pose information of the user of the external electronic device based on the sensing information received from the external electronic device. For example, the electronic device may calculate the amount of change of the pose information by calculating a difference between measurement values of the sensor (e.g., the sensor 250) of the external electronic device before and after a change in the pose of the user of the external electronic device.

In operation 605, the electronic device may determine whether the amount of change of the pose information is greater than or equal to the specified pose threshold. The specified pose threshold may be set to a value at which it may be determined that the field of view of the user of the external electronic device is changed by more than a specified range (e.g., an angle). The specified depth threshold associated with the amount of change of the depth information may be determined according to whether the amount of change of the pose information is equal to or greater than the specified pose threshold. The electronic device may perform operation 607 when it is determined that the amount of change of the pose information is less than the specified pose threshold (operation 605—NO), and may perform operation 609 when it is determined that the amount of change of the pose information is equal to or greater than the specified pose threshold (operation 605—YES).

In operation 607, the electronic device may determine the specified depth threshold as a first value. In operation 609, the electronic device may determine the specified depth threshold as a second value. The second value may be a value lower than the first value.

Hereinafter, an operation in which the electronic device transmits information on whether to transmit depth information to an external electronic device, according to an embodiment will be described with reference to FIG. 7.

Figure 7:
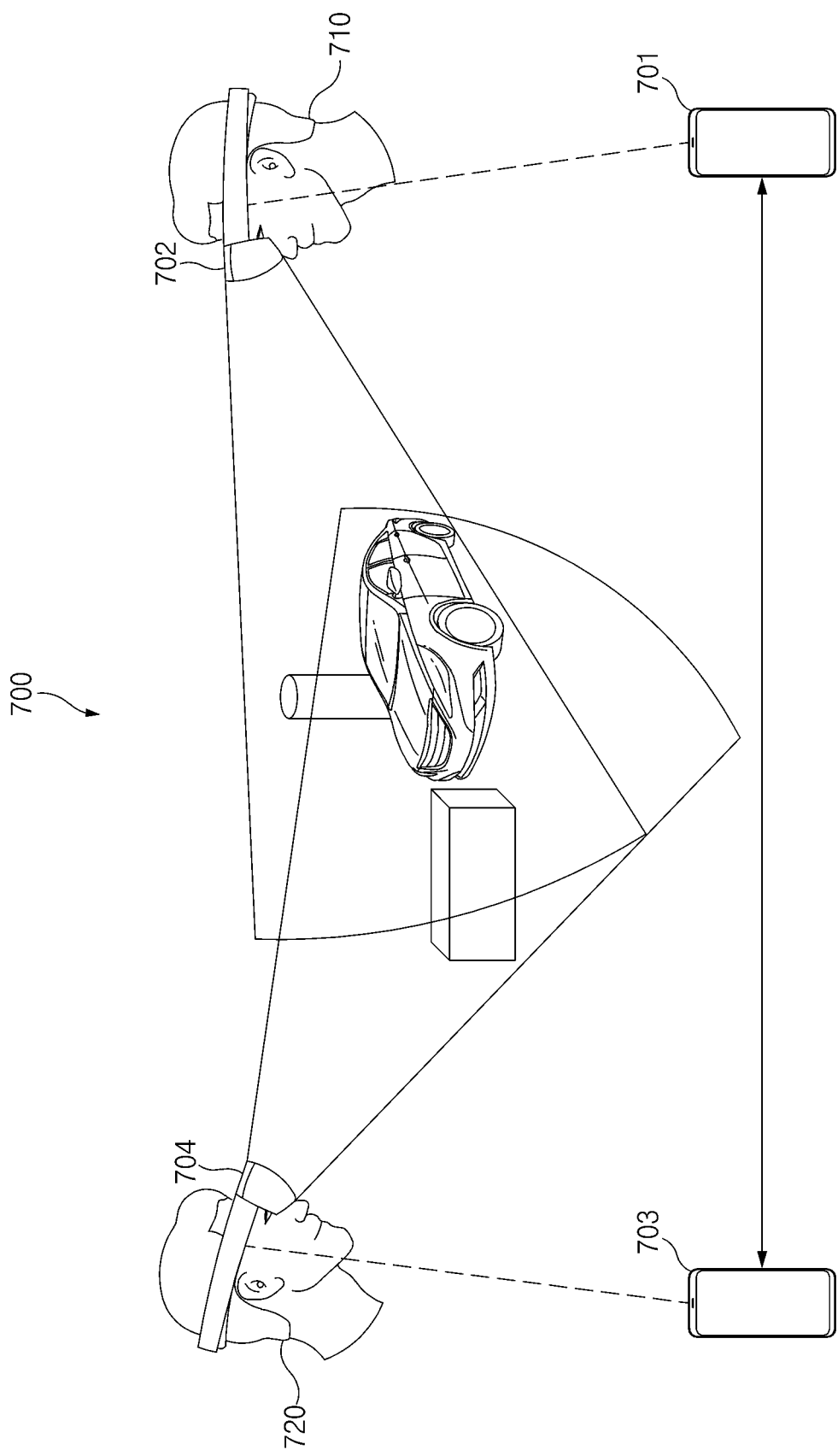
FIG. 7 is a diagram for describing an operation of an electronic device, according to an embodiment of the disclosure.

FIG. 7 is a diagram 700 for describing an operation of an electronic device according to an embodiment of the disclosure. Operations of an electronic device 701 described below may be performed by the first electronic device 201 of FIG. 2 or the first processor 230 of the first electronic device 201.

Referring to FIG. 7, the electronic device 701 may provide contents to a first user 710 through the display of a first external electronic device 702. According to an embodiment, a second external electronic device 703 may provide contents to a second user 720 through the display of a third external electronic device 704.

The electronic device 701 may communicate with the second external electronic device 703 through a network (e.g., the first network 198 or the second network 199 of FIG. 1). For example, the electronic device 701 and the second external electronic device 703 may access a cloud (not illustrated) to download and play the same content. As another example, the electronic device 701 and the second external electronic device 703 may access a server (not illustrated) and stream the same content. The contents may include a plurality of images corresponding to a plurality of frames as virtual reality content or augmented reality content. The electronic device 701 and the second external electronic device 703 may render a plurality of images and transmit them to the first external electronic device 702 and the third external electronic device 704, respectively. The rendered image transmitted by the electronic device 701 and the second external electronic device 703 to the first external electronic device 702 and the third external electronic device 704 may be a 3D image, and may include at least one 3D object.

The electronic device 701 may transmit at least one of color information and depth information of a plurality of frames to the first external electronic device 702 in frame order. The second external electronic device 703 may transmit at least one of color information and depth information of a plurality of frames to the third external electronic device 704 in frame order. The electronic device 701 may calculate an amount of change of depth information of at least one object between a first frame and a second frame after the first frame, and may determine whether to transmit the depth information of the second frame based on the amount of change of the depth information. The electronic device 701 may transmit information on whether to transmit the depth information of the second frame to the second external electronic device 703. The information on whether to transmit the depth information of the second frame may mean information indicating that the depth information of the second frame should be transmitted or that the depth information of the second frame should not be transmitted. The second external electronic device 703 may determine whether or not to transmit the depth information of the second frame based on the information on whether to transmit the second frame received from the electronic device 701 without calculating the amount of change of the depth information of at least one object between the first frame and the second frame.

In the above-described embodiment, although the case has been described in which the amount of change of the depth information for the first frame and the second frame is calculated and whether to transmit the depth information of the second frame is determined based on the calculated amount of depth information, the same may be applied to subsequent frames.

In the above-described embodiment, although the case has been described in which the electronic device 701 directly transmits information on whether to transmit depth information of the frame to the second external electronic device 703, the electronic device 701 may upload information on whether to transmit the frame depth information to a cloud (not illustrated) that provides contents or may transmit it to a server (not illustrated) that provides contents. The second external electronic device 703 may also receive information on whether to transmit depth information of each frame with respect to a plurality of frames included in contents together with contents from a cloud (not illustrated) or a server (not illustrated).

According to an embodiment, as a plurality of electronic devices (e.g., the electronic device 701 and the second external electronic device 703) providing the same contents share the amount of change of the depth information calculated by one electronic device (e.g., the electronic device 701), it is possible to prevent other electronic devices from performing redundant operations, thereby reducing current consumption of the entire plurality of electronic devices.

Hereinafter, an operation of an electronic device according to an embodiment will be described with reference to FIG. 8.

Figure 8:
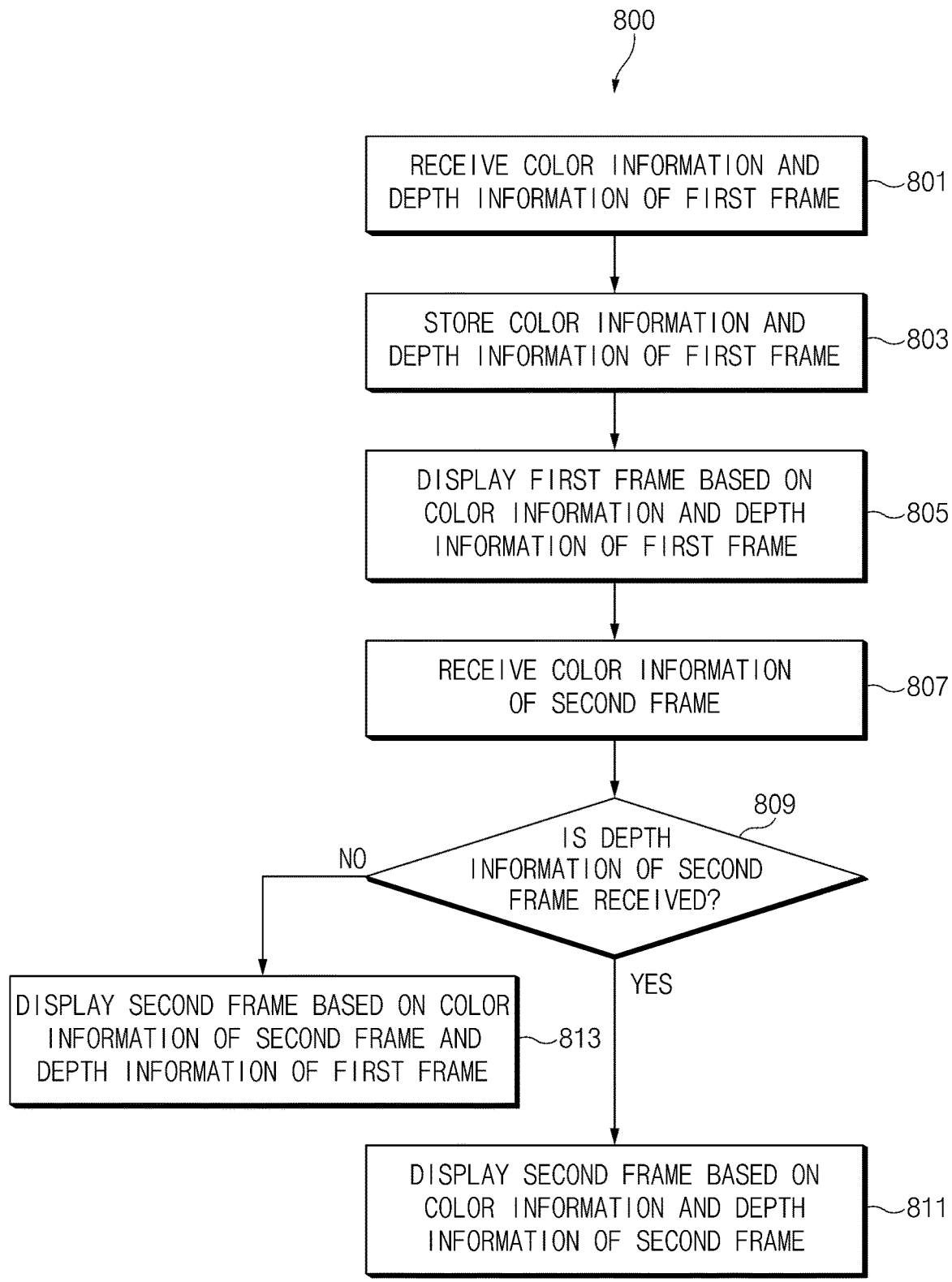
FIG. 8 is a flowchart illustrating an operation of an electronic device, according to an embodiment of the disclosure.

FIG. 8 is a flowchart 800 illustrating an operation of an electronic device according to an embodiment of the disclosure. Operations of an electronic device described below may be performed by the second electronic device 202 of FIG. 2 or the second processor 280 of the second electronic device 202.

In operation 801, the electronic device may receive color information and depth information of a first frame. The electronic device may receive color information of the first frame and depth information of the first frame from the external electronic device (e.g., the first electronic device 201 of FIG. 2) connected through a communication circuit (e.g., the second communication circuit 240 of FIG. 2).

In operation 803, the electronic device may store color information and depth information of a first frame. The electronic device may store the color information of the first frame and the depth information of the first frame received from the external electronic device in a memory (e.g., the second memory 270 of FIG. 2). The memory may include a first memory area storing color information of the frame and a second memory area storing depth information of the frame. In this case, the first memory and the second memory may be physically separated or only conceptually separated. For example, the first memory area and the second memory area may mean different areas (e.g., a memory address area) on one hardware structure.

In operation 805, the electronic device may display the first frame based on color information and depth information of the first frame. The electronic device may display the first frame on the display (e.g., the display 260 of FIG. 2) based on the color information of the first frame and the depth information of the first frame. According to an embodiment, displaying the first frame by the electronic device may mean displaying an image corresponding to the first frame. The electronic device may perform the reprojection on a rendered image received from an external electronic device based on the depth information of the first frame, and may display the image on which the reprojection is performed on the display. In this case, the rendered image received from the external electronic device may be referred to as the color information of the first frame. Hereinafter, the same may be applied to the second frame.

In operation 807, the electronic device may receive color information of the second frame. The second frame may be a frame after the first frame. For example, the second frame may be a frame continuous with the first frame. The electronic device may receive color information of the second frame after the first frame from the external electronic device. As described above with reference to FIG. 2, since the external electronic device (e.g., the first electronic device 201 of FIG. 2) determines whether to transmit the depth information of the second frame based on the amount of change of depth information of at least one object included in the first frame and the second frame, the electronic device may receive the depth information of the second frame together with the color information of the second frame, or may receive only the color information of the second frame from the external electronic device. The electronic device may store the color information of the second frame received from the external electronic device in the first memory area. According to one embodiment, the electronic device may update information stored in the first memory area from color information of the first frame to color information of the second frame.

In operation 809, the electronic device may determine whether depth information of the second frame is received. According to one embodiment, information used by the electronic device to display the second frame may vary according to whether the electronic device receives the depth information of the second frame. According to an embodiment, when the depth information of the second frame is received from the external electronic device, the electronic device may store the depth information of the second frame in the second memory area. The electronic device may update information stored in the second memory area from depth information of the first frame to depth information of the second frame. According to an embodiment, when depth information of the second frame is not received from the external electronic device, the electronic device may maintain the second memory in a state in which depth information of the first frame is stored. The electronic device may perform operation 811 when depth information of the second frame is received from the external electronic device (operation 809—YES), and may perform operation 813 when depth information of the second frame is not received from the external electronic device (operation 809—NO).

In operation 811, the electronic device may display the second frame based on color information and depth information of the second frame. The electronic device may display the second frame based on the color information of the second frame stored in the first memory area and the depth information of the second frame stored in the second memory area.

In operation 813, the electronic device may display the second frame based on the color information of the second frame and the depth information of the first frame. The electronic device may display the second frame based on the color information of the second frame stored in the first memory area and the depth information of the first frame stored in the second memory area. According to an embodiment, by reusing the previously received depth information of the previous frame when the depth information of the frame to be displayed is not received from the external electronic device, the electronic device may reduce current consumption by reducing the amount of data transmitted/received to and from the external electronic device.

According to an embodiment of the disclosure, an electronic device (e.g., the electronic device 101 of FIG. 1, the first electronic device 201 of FIG. 2, the first electronic device 301 of FIG. 3, the first electronic device 501 of FIG. 5, or the electronic device 701 of FIG. 7) includes a communication circuit (e.g., the communication module 190 of FIG. 1 or the first communication circuit 210 of FIG. 2), a memory (e.g., the memory 130 of FIG. 1 or the first memory 220 of FIG. 2), and a processor (e.g., the processor 120 of FIG. 1 or the first processor 230 of FIG. 2) operatively connected with the communication circuit and the memory, the memory stores one or more instructions that, when executed, cause the processor to perform a plurality of operations, the plurality of operations comprising: transmitting color information indicating colors of a plurality of pixels forming a first frame and depth information indicating depths of the plurality of pixels to a first external electronic device (e.g., the electronic device 102 of FIG. 1, the electronic device 104 of FIG. 1, the second electronic device 202 of FIG. 2, the second electronic device 302 of FIG. 3, the second electronic device 502 of FIG. 5, or the first external electronic device 702 of FIG. 7) connected through the communication circuit, obtaining color information and depth information of a second frame following the first frame, calculating an amount of change of depth information of at least one object included in the first frame and the second frame based on the depth information of the first frame and the depth information of the second frame, determining whether the amount of change of the depth information is greater than or equal to a specified depth threshold, and transmitting the depth information of the second frame together with the color information of the second frame to the first external electronic device based on that being determined that the amount of change of the depth information is greater than or equal to the specified depth threshold.

According to an embodiment of the disclosure, the plurality of operations further comprises, transmitting only the color information of the second frame to the first external electronic device except for the depth information of the second frame based on that being determined that the amount of change of the depth information is less than the specified depth threshold.

According to an embodiment of the disclosure, the plurality of operations further comprises transmitting, to the first external electronic device, notification information indicating that there is no depth information to be transmitted based on that being determined that the amount of change of the depth information is less than the specified depth threshold.

According to an embodiment of the disclosure, the plurality of operations further comprises receiving sensing information on at least one of a position, a direction, or a movement of the first external electronic device through the communication circuit depending on a specified period, calculating an amount of change in a pose of a user of the first external electronic device based on the sensing information, and determining the specified depth threshold for the amount of change of the depth information based on the amount of change in the pose of the user.

According to an embodiment of the disclosure, the plurality of operations further comprises determining the specified depth threshold for the amount of change of the depth information as a first value based on the amount of change in the pose of the user being less than a specified pose threshold, and determining the specified depth threshold for the amount of change of the depth information as a second value lower than the first value based on the amount of change in the pose of the user being greater than or equal to the specified pose threshold.

According to an embodiment of the disclosure, the plurality of operations further comprises calculating the amount of change of the depth information, based on at least one of the number of objects included in each of the first frame and the second frame, or depth information of the at least one object in each of the first frame and the second frame, and the depth information of the at least one object may include depth information of at least one pixel corresponding to the at least one object.

According to an embodiment of the disclosure, the plurality of operations further comprises calculating the amount of change of the depth information by calculating a difference between the number of objects included in the first frame and the number of objects included in the second frame.

According to an embodiment of the disclosure, plurality of operations further comprises calculating the number of objects of which the depth information of the second frame is changed by more than a specified amount of change based on the depth information in the first frame among the at least one object.

According to an embodiment of the disclosure, plurality of operation further comprise calculating the amount of change of the depth information by calculating an average value of a amount of change from the depth information in the first frame to the depth information in the second frame with respect to the at least one object.

According to an embodiment of the disclosure, the plurality of operations further comprises determining whether to transmit the depth information of the second frame based on the amount of change of the depth information, to transmit information on whether the depth information of the second frame is transmitted to a second external electronic device (e.g., the second external electronic device 703 of FIG. 7) through the communication circuit.

According to an embodiment disclosed in the disclosure, an electronic device (e.g., the electronic device 101 of FIG. 1, the second electronic device 202 of FIG. 2, the second electronic device 302 of FIG. 3, the second electronic device 502 of FIG. 5, or the first external electronic device 702 of FIG. 7) includes a communication circuit (e.g., the communication module 190 of FIG. 1 or the second communication circuit 240 of FIG. 2), a sensor (e.g., the sensor module 176 of FIG. 1 or the sensor 250 of FIG. 2), a display (e.g., the display module 160 of FIG. 1 or the display 260 of FIG. 2), a memory (e.g., the memory 130 of FIG. 1 or the second memory 270 of FIG. 2), and a processor (e.g., the processor 120 of FIG. 1 or the second processor 280 of FIG. 2) operatively connected with the communication circuit, the sensor, the display, and the memory, and the memory stores one or more instructions that, when executed, cause the processor to perform a plurality of operations comprising: storing color information and depth information of a first frame received from an external electronic device (e.g., the electronic device 102 of FIG. 1, the electronic device 104 of FIG. 1, the server 108 of FIG. 1, the first electronic device 201 of FIG. 2, the first electronic device 301 of FIG. 3, the first electronic device 501 of FIG. 5, or the electronic device 701 of FIG. 7) connected through the communication circuit, displaying the first frame on the display based on the color information of the and the depth information of the first frame, displaying a second frame on the display based on color information and depth information of a second frame, based on the color information and the depth information of the second frame following the first frame being received from the external electronic device through the communication circuit, and displaying the second frame on the display based on the color information of the second frame and the depth information of the first frame based on only the color information of the second frame being received without receiving the depth information of the second frame from the external electronic device through the communication circuit.

According to an embodiment of the disclosure, the electronic device may be a wearable electronic device that is worn on at least a part of a user's body, and the plurality of operations further comprises obtaining information on at least one of a position, a direction, or a movement of the first electronic device by using the sensor, and to transmit the sensing information to the external electronic device through the communication circuit.

According to an embodiment disclosed in the disclosure, an operating method of an electronic device (e.g., the electronic device 101 of FIG. 1, the first electronic device 201 of FIG. 2, the first electronic device 301 of FIG. 3, the first electronic device 501 of FIG. 5, or the electronic device 701 of FIG. 7) includes transmitting color information indicating colors of a plurality of pixels forming a first frame and depth information indicating depths of the plurality of pixels to a first external electronic device (e.g., the electronic device 102 of FIG. 1, the electronic device 104 of FIG. 1, the second electronic device 202 of FIG. 2, the second electronic device 302 of FIG. 3, the second electronic device 502 of FIG. 5, or the first external electronic device 702 of FIG.

7) connected through a communication circuit (e.g., the communication module 190 of FIG. 1 or the first communication circuit 210 of FIG. 2) of the electronic device, obtaining color information and depth information of a second frame following the first frame, calculating an amount of change of depth information of at least one object included in the first frame and the second frame based on the depth information of the first frame and the depth information of the second frame, determining whether the amount of change of the depth information is greater than or equal to a specified depth threshold, and transmitting the depth information of the second frame together with the color information of the second frame to the first external electronic device based on that being determined that the amount of change of the depth information is greater than or equal to the specified depth threshold.

According to an embodiment of the disclosure, the method may further include transmitting only the color information of the second frame to the first external electronic device except for the depth information of the second frame based on that being determined that the amount of change of the depth information is less than the specified depth threshold.

According to an embodiment of the disclosure, the method may further include receiving sensing information on at least one of a position, a direction, or a movement of the first external electronic device through the communication circuit depending on a specified period, calculating an amount of change in a pose of a user of the first external electronic device based on the sensing information, and determining the specified depth threshold for the amount of change of the depth information based on the amount of change in the pose of the user.

According to an embodiment of the disclosure, the method may further include determining the specified depth threshold for the amount of change of the depth information as a first value based on the amount of change in the pose of the user being less than a specified pose threshold, and determining the specified depth threshold for the amount of change of the depth information as a second value lower than the first value based on the amount of change in the pose of the user being greater than or equal to the specified pose threshold.

According to an embodiment of the disclosure, the method may further include calculating the amount of change of the depth information, based on at least one of the number of objects included in each of the first frame and the second frame, or depth information of the at least one object in each of the first frame and the second frame, and the depth information of the at least one object may include depth information of at least one pixel corresponding to the at least one object.

According to an embodiment of the disclosure, the method may further include calculating the amount of change of the depth information by calculating a difference between the number of objects included in the first frame and the number of objects included in the second frame.

According to an embodiment of the disclosure, the method may further include calculating the amount of change of the depth information by calculating the number of objects of which the depth information of the second frame is changed by more than a specified amount of change based on the depth information in the first frame among the at least one object.

According to an embodiment of the disclosure, the method may further include calculating the amount of change of the depth information by calculating an average value of an amount of change from the depth information in the first frame to the depth information in the second frame with respect to the at least one object.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, The module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a communication circuit;
a memory; and
a processor operatively connected with the communication circuit and the memory, and
wherein the memory stores one or more instructions that, when executed, cause the processor to perform a plurality of operations, the plurality of operations comprising:
transmitting color information indicating colors of a plurality of pixels forming a first frame and depth information indicating depths of the plurality of pixels to a first external electronic device connected through the communication circuit;
obtaining color information and depth information of a second frame following a first frame;
calculating an amount of change of depth information of at least one object included in the first frame and the second frame based on the depth information of the first frame and the depth information of the second frame;
determining whether the amount of change of the depth information is greater than or equal to a specified depth threshold; and
transmitting the depth information of the second frame together with the color information of the second frame to the first external electronic device based on that being determined that the amount of change of the depth information is greater than or equal to the specified depth threshold.

2. The electronic device of claim 1, wherein the plurality of operations further comprises:
transmitting only the color information of the second frame to the first external electronic device except for the depth information of the second frame based on that being determined that the amount of change of the depth information is less than the specified depth threshold.

3. The electronic device of claim 2, wherein the plurality of operations further comprise:
transmitting, to the first external electronic device, notification information indicating that there is no depth information to be transmitted based on that being determined that the amount of change of the depth information is less than the specified depth threshold.

4. The electronic device of claim 1, wherein the plurality of operations further comprises:
receiving sensing information on at least one of a position, a direction, or a movement of the first external electronic device through the communication circuit depending on a specified period;
calculating an amount of change in a pose of a user of the first external electronic device based on the sensing information; and
determining the specified depth threshold for the amount of change of the depth information based on the amount of change in the pose of the user.

5. The electronic device of claim 4, wherein the plurality of operations further comprises:
determining the specified depth threshold for the amount of change of the depth information as a first value based on the amount of change in the pose of the user being less than a specified pose threshold; and
determining the specified depth threshold for the amount of change of the depth information as a second value lower than the first value based on the amount of change in the pose of the user being greater than or equal to the specified pose threshold.

6. The electronic device of claim 1, wherein the plurality of operations further comprises:
calculating the amount of change of the depth information, based on at least one of the number of objects included in each of the first frame and the second frame, or depth information of the at least one object in each of the first frame and the second frame, and
wherein the depth information of the at least one object includes depth information of at least one pixel corresponding to the at least one object.

7. The electronic device of claim 6, wherein the plurality of operations further comprises:
calculating the amount of change of the depth information by calculating a difference between the number of objects included in the first frame and the number of objects included in the second frame.

8. The electronic device of claim 6, wherein the plurality of operations further comprises:
calculating the amount of change of the depth information by calculating the number of objects of which the depth information of the second frame is changed by more than a specified amount of change as compared to the first frame.

9. The electronic device of claim 6, wherein the plurality of operations further comprises:

calculating the amount of change of the depth information by calculating an average value of an amount of change from the depth information in the first frame to the depth information in the second frame with respect to the at least one object.

10. The electronic device of claim 1, wherein the plurality of operations further comprises:
determining whether to transmit the depth information of the second frame based on the amount of change of the depth information; and
transmitting information on whether the depth information of the second frame is transmitted to a second external electronic device through the communication circuit.

11. A method of operating an electronic device, the method comprising:
transmitting color information indicating colors of a plurality of pixels forming a first frame and depth information indicating depths of the plurality of pixels to a first external electronic device connected through a communication circuit of the electronic device;
obtaining color information and depth information of a second frame following the first frame;
calculating an amount of change of depth information of at least one object included in the first frame and the second frame based on the depth information of the first frame and the depth information of the second frame;
determining whether the amount of change of the depth information is greater than or equal to a specified depth threshold; and
transmitting the depth information of the second frame together with the color information of the second frame to the first external electronic device based on that being determined that the amount of change of the depth information is greater than or equal to the specified depth threshold.

12. The method of claim 11, further comprising:
when the amount of change of the depth information does not exceed the specified depth threshold, transmitting only the color information of the second frame to the first external electronic device except for the depth information of the second frame based on that being determined that the amount of change of the depth information is less than the specified depth threshold.

13. The method of claim 11, further comprising:
receiving sensing information on at least one of a position, a direction, or a movement of the first external electronic device through the communication circuit depending on a specified period;
calculating an amount of change in a pose of a user of the first external electronic device based on the sensing information; and
determining the specified depth threshold for the amount of change of the depth information based on the amount of change in the pose of the user.

14. The method of claim 13, further comprising:
determining the specified depth threshold for the amount of change of the depth information as a first value based on the amount of change in the pose of the user being less than a specified pose threshold; and
determining the specified depth threshold for the amount of change of the depth information as a second value lower than the first value based on the amount of change in the pose of the user being greater than or equal to the specified pose threshold.

15. The method of claim 11, further comprising:
calculating the amount of change of the depth information, based on at least one of the number of objects included in each of the first frame and the second frame, or depth information of the at least one object in each of the first frame and the second frame, and
wherein the depth information of the at least one object includes depth information of at least one pixel corresponding to the at least one object.

16. The method of claim 15, further comprising:
calculating the amount of change of the depth information by calculating a difference between the number of objects included in the first frame and the number of objects included in the second frame.

17. The method of claim 15, further comprising:
calculating the amount of change of the depth information by calculating the number of objects of which the depth information of the second frame is changed by more than a specified amount of change as compared to the first frame.

18. The method of claim 15, further comprising:
calculating the amount of change of the depth information by calculating an average value of an amount of change from the depth information in the first frame to the depth information in the second frame with respect to the at least one object.

* * * * *